(12) United States Patent
Xiao et al.

(10) Patent No.: US 11,860,364 B2
(45) Date of Patent: Jan. 2, 2024

(54) HEAD-MOUNTED AR APPARATUS

(71) Applicant: Matrixed Reality Technology Co., Ltd, Wuxi (CN)

(72) Inventors: Bing Xiao, Beijing (CN); Yue He, Beijing (CN); Jingxian Zhao, Beijing (CN); Chi Xu, Beijing (CN)

(73) Assignee: Matrixed Reality Technology Co., Ltd., Wuxi (CN)

( * ) Notice: Subject to any disclaimer, the term of this patent is extended or adjusted under 35 U.S.C. 154(b) by 563 days.

(21) Appl. No.: 17/058,921

(22) PCT Filed: May 27, 2019

(86) PCT No.: PCT/CN2019/088583
§ 371 (c)(1),
(2) Date: Nov. 25, 2020

(87) PCT Pub. No.: WO2019/228305
PCT Pub. Date: Dec. 5, 2019

(65) Prior Publication Data
US 2021/0215935 A1    Jul. 15, 2021

(30) Foreign Application Priority Data

May 28, 2018   (CN) .......................... 201820809494.1

(51) Int. Cl.
*G02B 27/01*   (2006.01)
*G02C 9/02*    (2006.01)
*G02C 5/12*    (2006.01)

(52) U.S. Cl.
CPC ........... *G02B 27/0172* (2013.01); *G02C 5/12* (2013.01); *G02C 9/02* (2013.01); *G02B 2027/0178* (2013.01)

(58) Field of Classification Search
None
See application file for complete search history.

(56) References Cited

U.S. PATENT DOCUMENTS 9,366,871 B2   6/2016   Ghosh et al.
9,733,481 B2   8/2017   Carollo et al.
(Continued)

FOREIGN PATENT DOCUMENTS

CN   107003523 A   8/2017
CN   206594363 U   10/2017
(Continued)

OTHER PUBLICATIONS

International Search Report dated Aug. 26, 2019, for parent application PCT/CN2019/088583, filed on May 27, 2019. Chinese with English translation.

*Primary Examiner* — Bao-Luan Q Le
*Assistant Examiner* — Danell L Owens
(74) *Attorney, Agent, or Firm* — Kilpatrick Townsend & Stockton LLP

(57) ABSTRACT

The present application discloses a head-mounted augmented reality (AR) apparatus, including: a head gear for being worn on a user's head; an optical module configured to provide AR display, connected to the head gear, and movable relative to the head gear; and a limit mechanism acting between the head gear and the optical module to enable the optical module to be selectively lockable in a first position or a second position relative to the head gear, in which in the first position the user when wearing the head gear is able to observe the outside scenery only through the optical module, and in the second position the user when wearing the head gear is able to observe the outside scenery completely not through the optical module. The present application also discloses a pair of AR eyeglasses similarly configured and an AR device for installation on the eyeglasses. Using the inventive technical means, the user is able to observe the real-world scene clearly and conveniently at any time.

9 Claims, 7 Drawing Sheets

(56) References Cited

U.S. PATENT DOCUMENTS

| | | |
|---|---|---|
| 10,345,602 B2 | 7/2019 | Carollo et al. |
| 10,782,533 B2 | 9/2020 | Tatsuta |
| 2014/0340424 A1* | 11/2014 | Ellsworth ................ G02B 5/30 359/630 |
| 2015/0219930 A1 | 8/2015 | Cohn |
| 2016/0116748 A1* | 4/2016 | Carollo ................ H04N 13/286 359/632 |
| 2016/0274364 A1 | 9/2016 | Carollo et al. |
| 2017/0045746 A1 | 2/2017 | Ellsworth |
| 2018/0024370 A1 | 1/2018 | Carollo et al. |
| 2019/0361244 A1 | 11/2019 | Carollo et al. |
| 2020/0326551 A1 | 10/2020 | Carollo et al. |

FOREIGN PATENT DOCUMENTS

| | | | |
|---|---|---|---|
| CN | 108061969 A | 5/2018 | |
| CN | 207352282 U | 5/2018 | |
| CN | 108254921 A * | 7/2018 | ......... G02B 27/0172 |
| CN | 208141052 U | 11/2018 | |
| WO | 2017004695 A1 | 1/2017 | |
| WO | 2018/003084 A1 | 1/2018 | |

\* cited by examiner

HEAD-MOUNTED AR APPARATUS

FIELD

The present application relates to a head-mounted augmented reality (AR) apparatus, more particularly to a head-mounted AR apparatus, particularly a pair of AR eyeglasses, by which a user is able to observe real-world scene more clearly.

BACKGROUND

AR technology can be called as mixed display technology. Its principle is that an image source controllable by a computer is used to present an image, which is displayed for a user, to eyes of the user, and the presented image is superimposed with a real-world environmental image which can be directly seen by the eyes of the user so that real-world scene information augmented with the image presented via the computer is provided for the user. This kind of technology plays an increasingly important role in facilitating design and development of industrial products by designers.

A head-mounted AR apparatus is generally in the form of a head-mounted helmet or AR eyeglasses. For instance, the AR technology can exert more influence in the industrial field. In particularly, if such technology is used for a smart eyeglasses device, the user who wears the smart eyeglasses device is able to observe the real-world industrial scene with an embedded system of the smart eyeglasses acquiring the scene's image via its camera. Then, the scene and objects in the scene can be identified, and virtual prompt graphics and texts can be displayed on an optical lens of the smart eyeglasses via three-dimensional (3D) registration technology so as to step-by-step guide the user's operations on industrial equipment, record intermediate result information and thus conduct big data analysis.

Take the AR eyeglasses for example. It generally includes a frame and an optical module secured on the frame. As an example only, the optical module can generally include an image source, a beam splitter and a semi-reflector such that an AR image can be projected into a person's eyes to be superimposed on the real-world scene information and thus to provide an AR display effect. Therefore, the optical lens' body and coatings thereon of the optical module may attenuate real-world scene light beams entering the person's eyes and result in color aberrations or distortions of the real-world scene's image. Therefore, in order to observe the real-world scene more clearly, the user will have to temporarily stop the operation of the optical module and take off the eyeglasses. Repeatedly taking off or putting on the eyeglasses will result in a poor experience for the user. Besides, how to reduce the color aberrations or distortions of the real-world scene's image during the operation of the optical module is also a crucial problem that needs to be solved.

SUMMARY

The present application is aimed at proposing a head-mounted AR apparatus, particularly a pair of AR eyeglasses, such that it is more convenient for a user to clearly observe real-world scene images when its optical module operates or does not operate.

According to one aspect of the present application, a head-mounted augmented reality (AR) apparatus is provided, which includes:

a) a head gear configured to be worn on a user's head;

b) an optical module configured to provide AR display, connected to the head gear and movable relative to the head gear; and c) a limit mechanism acting between the head gear and the optical module to enable the optical module to be selectively lockable in a first position or a second position relative to the head gear, in which in the first position the user, when wearing the head gear, is able to observe the outside scenery only through the optical module, and in the second position the user, when wearing the head gear, is able to observe the outside scenery completely not through the optical module. In this way, the user can clearly observe the real-world scene without repeatedly taking off the head-mounted AR apparatus, so as to provide convenience for the user.

Optionally, the optical module is slidable relative to the head gear. Optionally, the optical module is pivotable relative to the head gear.

Optionally, the optical module is lockable by the limit mechanism in a position between the first position and the second position, in which position the user, when wearing the head gear, is able to observe the outside scenery both through the optical module and directly. Therefore, when the optical module operates, the user is able to clearly observe the real-world scene, and the optical module can provide the AR display effect for the user such that it facilitates the user to carry out respective development and design work.

Optionally, the position between the first position and the second position is a middle position. In this way, the best equilibrium between observing the real-world scene and the AR display effect can be reached. In this case, the middle position between the first position and the second position means that about one half of the horizontal sight of the user, when wearing the head gear of the head-mounted AR apparatus, is able to pass through the optical module to observe the outside scenery and the other half is used to directly observe the outside scenery.

Optionally, a sliding rail is arranged on one of the head gear and the optical module, and a sliding slot configured to cooperate with the sliding rail is arranged on the other of the head gear and the optical module so as to enable the head gear to be slidable relative to the optical module.

Optionally, the limit mechanism includes a first feature provided in one of the sliding rail and the sliding slot and a second feature provided in the other of the sliding rail and the sliding slot, the number of the second feature is equal to the number of locked locations of the optical module relative to the fit bracket, and the second feature is able to cooperate with and be locked to the first feature. In this way, at the locked locations, relative locking can be implemented by the cooperation of the features.

Optionally, the first feature is configured as a spring-loaded ball, and the second feature is configured as a recess; or the first feature is configured as a recess, and the second feature is configured as a spring-loaded ball; or the first feature and the second feature are configured as magnets which are attractive to each other; or the first feature and the second feature are locked to each other via interference-fit.

Optionally, the limit mechanism includes a first pair of fit features and a second pair of fit features arranged between the optical module and the head gear, in which the first pair of fit features are able to cooperate with each other in the first position to lock the optical module to the head gear in place, and the second pair of fit features are able to cooperate with each other in the second position to lock the optical module to the head gear in place.

Optionally, at least one of the first pair of fit features and the second pair of fit features cooperates with each other via magnetism, snap-fit or interference-fit.

Optionally, the head gear is a frame of the eyeglasses, the frame is hinged with a pair of legs, and the optical module is connected to the frame and is movable relative to the frame.

Optionally, the head gear is a frame of the eyeglasses, the frame is hinged with a pair of legs, and the optical module is pivotally connected to the frame by a shaft, and the shaft is substantially parallel to or perpendicular to a length direction of the frame.

According to another aspect of the present application, an augmented reality (AR) device for installation on a pair of eyeglasses is provided, which includes:

a) a fit bracket removably installed on a frame of the eyeglasses;

b) an optical module configured to provide AR display, connected to the fit bracket and movable relative to the fit bracket; and c) a limit mechanism acting between the fit bracket and the optical module to enable the optical module to be selectively lockable in a first position or a second position relative to the fit bracket, in which in the first position the user, when wearing the frame, is able to observe the outside scenery only through the optical module, and in the second position the user, when wearing the frame, is able to observe the outside scenery completely not through the optical module. It is convenient to upgrade a pair of existing eyeglasses by the proposed AR device. For instance, for a user who often wears a pair of dioptric eyeglasses, he/she can install the proposed AR device on his/her eyeglasses to obtain the AR display effect and can clearly observe the real-world scene without repeatedly taking off the AR device. It provides convenience for the user.

Optionally, the optical module is slidable relative to the fit bracket. Optionally, the optical module is pivotable relative to the fit bracket.

Optionally, the optical module is lockable by the limit mechanism in a position between the first position and the second position, in which position a user, when wearing the frame, is able to observe the outside scenery both through the optical module and directly. Therefore, when the optical module operates, the user is able to clearly observe the real-world scene, and the optical module can provide the AR display effect for the user such that it facilitates the user to carry out respective development and design work.

Optionally, the position between the first position and the second position is a middle position. In this way, the best equilibrium between observing the real-world scene and the AR display effect can be reached. In this case, the middle position between the first position and the second position means that about one half of the horizontal sight of the user, when wearing the frame, is able to pass through the optical module to observe the outside scenery and the other half is used to directly observe the outside scenery.

Optionally, a sliding rail is arranged on one of the fit bracket and the optical module, and a sliding slot configured to cooperate with the sliding rail is arranged on the other of the fit bracket and the optical module.

Optionally, the limit mechanism includes a first feature provided in one of the sliding rail and the sliding slot and a second feature provided in the other of the sliding rail and the sliding slot, the number of the second feature is equal to the number of locked locations of the optical module relative to the fit bracket, and the second feature is able to cooperate with and be locked to the first feature. In this way, at the locked locations, relative locking can be implemented by the cooperation of the features.

Optionally, the first feature is configured as a spring-loaded ball, and the second feature is configured as a recess; or the first feature is configured as a recess, and the second feature is configured as a spring-loaded ball; or the first feature and the second feature are configured as magnets which are attractive to each other; or the first feature and the second feature are locked to each other via interference-fit.

Optionally, the optical module is pivotally connected to the fit bracket by a shaft, and the shaft is substantially parallel to or perpendicular to a length direction of the fit bracket.

Optionally, the limit mechanism includes a first pair of fit features and a second pair of fit features arranged between the optical module and the fit bracket, in which the first pair of fit features are able to cooperate with each other in the first position to lock the optical module to the fit bracket in place, and the second pair of fit features are able to cooperate with each other in the second position to lock the optical module to the fit bracket in place.

Optionally, at least one of the first pair of fit features and the second pair of fit features cooperate with each other via magnetism, snap-fit or interference-fit.

BRIEF DESCRIPTION OF THE DRAWINGS

The foregoing and other aspects of the present application will be well understood from the following detailed explanation in combination with the attached drawings. It is noticed that although those drawings may be given in different proportions for clarity, they shall not be deemed to affect understanding to the present application. In the drawings.

DETAILED DESCRIPTION OF THE INVENTION

Figure 1:
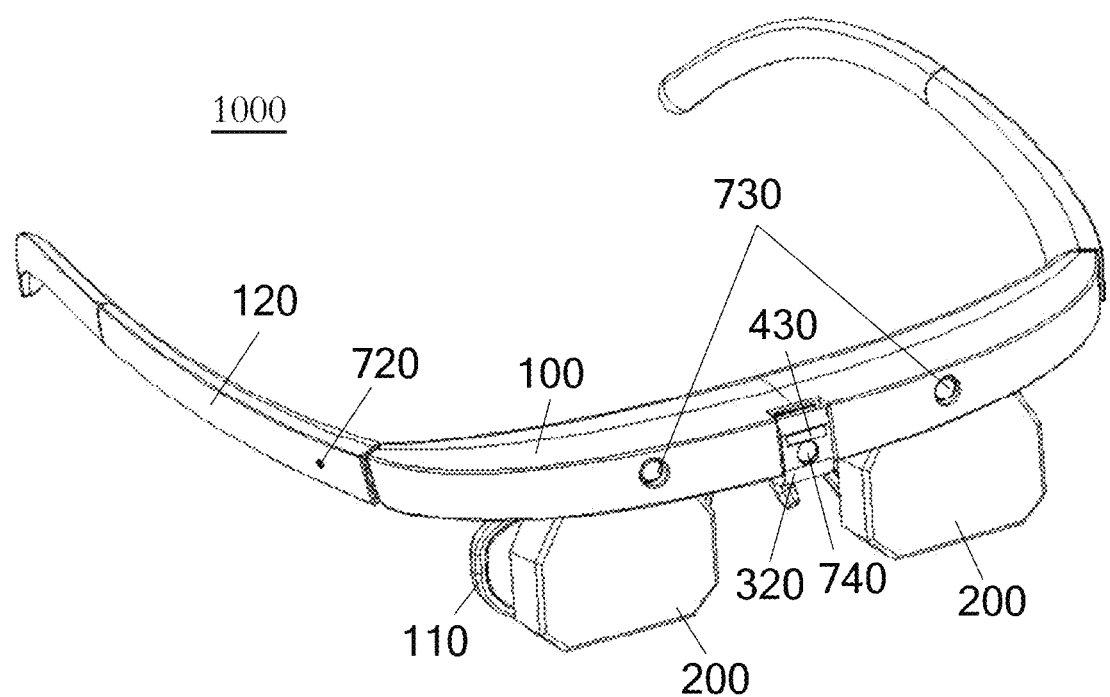
FIG. 1 is a perspective view schematically illustrating a pair of AR eyeglasses according to a first embodiment of the present application, in which an optical module of the AR eyeglasses is in a first position.
Figure 2:
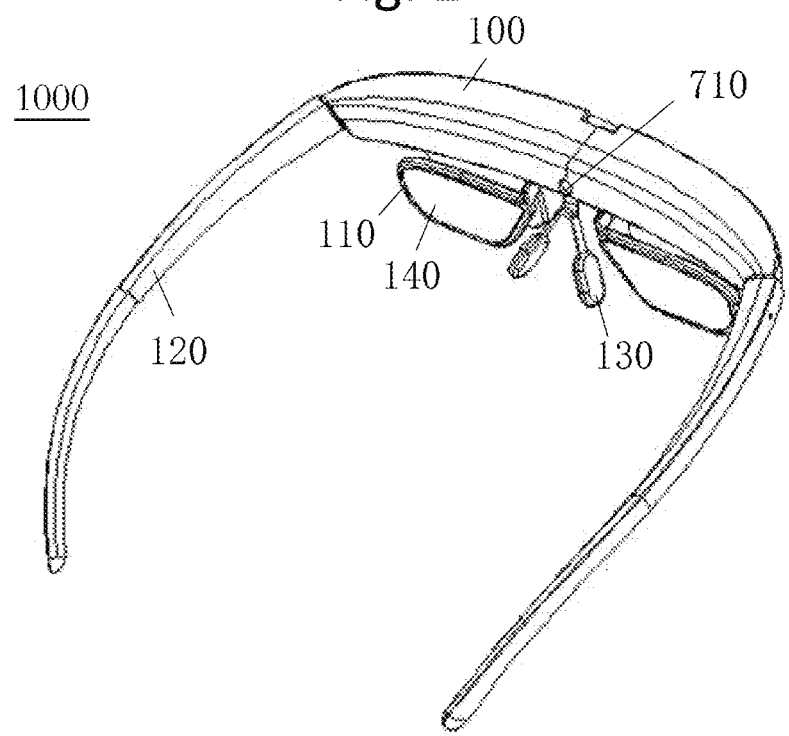
FIG. 2 is a perspective view schematically illustrating the AR eyeglasses according to the first embodiment of the present application viewed along another direction, in which the optical module of the AR eyeglasses is in the first position.

In the drawings of the present application, features having the same configurations or similar functions are represented by the same reference numerals.

Embodiments of the present application will be explained by referring to the attached drawings below. It should be understood by one ordinary person in the art that although a head-mounted AR apparatus of the present application is described below in the form of AR eyeglasses, the same technical content can be applied to other forms of head-mounted AR apparatuses, such as AR helmets or the like.

A pair of AR eyeglasses 1000 according to a first embodiment of the present application is schematically illustrated by FIGS. 1 to 4. The AR eyeglasses 1000 includes a frame 100 and an optical module 200 connected to the frame 100. As shown, the frame 100 is hinged with a pair of legs 120 and is secured with a nose pad 130. The optical module 200 can also be called as a display module. As an example only, the optical module generally includes an image source, a beam splitter and a semi-reflector such that under the control of a computer an augmented reality image can be projected into a person's eyes to be superimposed with real-world scene information and thus to provide an augmented reality display effect. Therefore, in the context of the present application, the optical module is a device configured to provide the augmented reality display effect. For instance, designs relating to the optical module can refer to publications CN107085306A, CN206863344U, CN207924257U, CN207924256U, CN208126018U, CN107422481A, and CN206990935U, whose full texts can be incorporated here for references.

When the optical module 200 operates, the augmented reality image can be projected to the person's eyes under the control of the computer and, at the same time, the person with his/her eyes can observe a real-world scene image through the optical module 200, such that the two images are superimposed on each other so as to provide the augmented reality display effect for a user.

In an optional embodiment, a lens bracket 110 is provided on the frame 100. A pair of lenses 140 are installed in the lens bracket 110. It should be understood by the ordinary person in the art that the lens bracket 110 is just an optional accessary for the AR eyeglasses of the present application. For instance, the lens bracket 110 can be secured to the frame 100 via screwing or welding or the like such that the person with his/her eyes is able to observe the real-world scene. The lens 140 includes any suitable lens such as a diopter lens, sunglasses, a plano lens. In a preferred embodiment, the lens bracket 110 is removably connected to the frame 100 such that the user can choose to use the lens bracket 110 depending on his/her needs.

Furthermore, the nose pad 130 is connected to the frame 100 at a middle location of the lens bracket 110, for example at a lower location of the lens bracket. In particular, the nose pad 130 can be secured onto the frame 100 via a suitable manner such as magnetism, snapping-fit, screwing or the like. In the illustrated embodiment, the optical module 200 includes two optical modules and/or the lens 140 includes two lenses. However, it should be understood by the ordinary person in the art that the number of them can be one.

According to the embodiment, the AR eyeglasses 1000 further includes a range sensor 710, an ambient light sensor 720, a binocular camera 730 and a camera unit 740. As shown in FIG. 1, the range sensor 710 is arranged on a side of the lens bracket 110 departing from the optical module 200. The ambient light sensor 720 is arranged on a side of each leg 120 departing from the frame 100. The binocular camera 730 is arranged on a front side of the frame 100. The camera unit 740 can be arranged on a base 320 of the optical module 200, as described below.

The optical module 200 includes an optics system, a main circuit board, a camera and so on. The optics system is integrated with a display screen and an optical lens, whose constructions are not limited to those as illustrated. After wearing and when the optical module 200 are not moved, an optical axis of the optical lens is exactly or substantially located at the center of the vision field, particularly the horizontal vision field, of the user. In this way, the content displayed by the display screen can be projected onto the optical lens such that the wearer can observe the content projected on the optical lens and look at the real-world scene through the optical lens so as to combine a virtual image with the real-world scene.

The range sensor 710 is connected to the main circuit board by a flexible circuit board. The range sensor 710 is used to detect a distance from a rear obstacle and thus to determine whether the AR eyeglasses is worn by the user. When the AR eyeglasses is worn, the range sensor 710 detects that the distance from the rear obstacle is in a threshold range, and the display screen is on. When the AR eyeglasses is detected to be not worn, the range sensor 710 detects that the distance from the rear obstacle is out of the threshold range, and the display screen is off. The ambient light sensor 720 is connected to the main circuit board by a flexible circuit board, and is used to detect the intensity of ambient light to automatically adjust the brightness of the display screen. The binocular camera 730 is connected to the main circuit board by a flexible circuit board, and has two cameras to scan and discern the environment, make depth perception calculation using parallax between the two cameras, and thus constitute three-dimensional information of the ambient environment. The camera unit 740 is connected to the main circuit board by a flexible circuit board, and is used to capture the ambient scene.

In the embodiment illustrated by FIGS. 1 to 4, the optical module 200 is movable relative to the frame 100, for example pivotable/rotatable upwards or downwards, such that the optical module 200 is able to be located in a first position and a second position. In the first position, the user, when wearing the AR eyeglasses 1000, can observe the real-world scene, i.e. the outside scenery, only through the optical module 200. In the second position, the user, when wearing the AR eyeglasses 1000, can observe the real-world scene, i.e. the outside scenery, completely not through the optical module 200. That is to say, an augmented reality display effect can be provided for the user only when the optical module 200 is in the first position. In the context of the present application, observing the real-world scene, i.e. the outside scenery only through the optical module means that the optical module, particularly its optical lens is located completely within the static vision field of the user or that the user's sight, particularly horizontal sight shall pass through the optical module so as to clearly observe the real-world scene or the outside scenery. Furthermore, in the context of the present application, observing the real-world scene, i.e. the outside scenery completely not through the optical module 200 means that the optical module or its optical lens is located substantially out of the static vision field of the user or that the user's sight, particularly horizontal sight does not pass through the optical module and the user can clearly observe the real-world scene or the outside scenery. The term "static vision field" refers to a spatial range that can be seen by eyes of a person when he/she watches an object directly in front of him/her with his/her head and eyes being stationary.

Further as shown, two optical modules 200 are connected to each other by the base 320. For instance, the base 320 can be made as a single piece of a plastic. For instance, the base 320 can be integrally formed with a connection rod. The two optical modules 200 are securely connected to both ends of the connection rod respectively. Furthermore, in the embodiments of the present application, the base 320 can be a constituent part of the optical module 200, for example as a part of its housing.

Furthermore, the base 320 of the optical module 200 is passed by a shaft 310 (hidden in FIGS. 1 to 3 and shown in FIG. 4) which is arranged in a middle groove 301 of the frame 100, such that the optical module 200 is pivotable around the shaft relative to the frame 100. In the embodiment illustrated by FIGS. 1 to 4, the base 320 has a rotational axis which is substantially parallel to a length direction of the frame 100. In an alternative embodiment, the rotational axis of the base 320 can be defined by two opposite lugs of the base 320, which lugs can be respectively snapped into two opposing recesses of the middle groove 301 of the frame 100.

Figure 3:
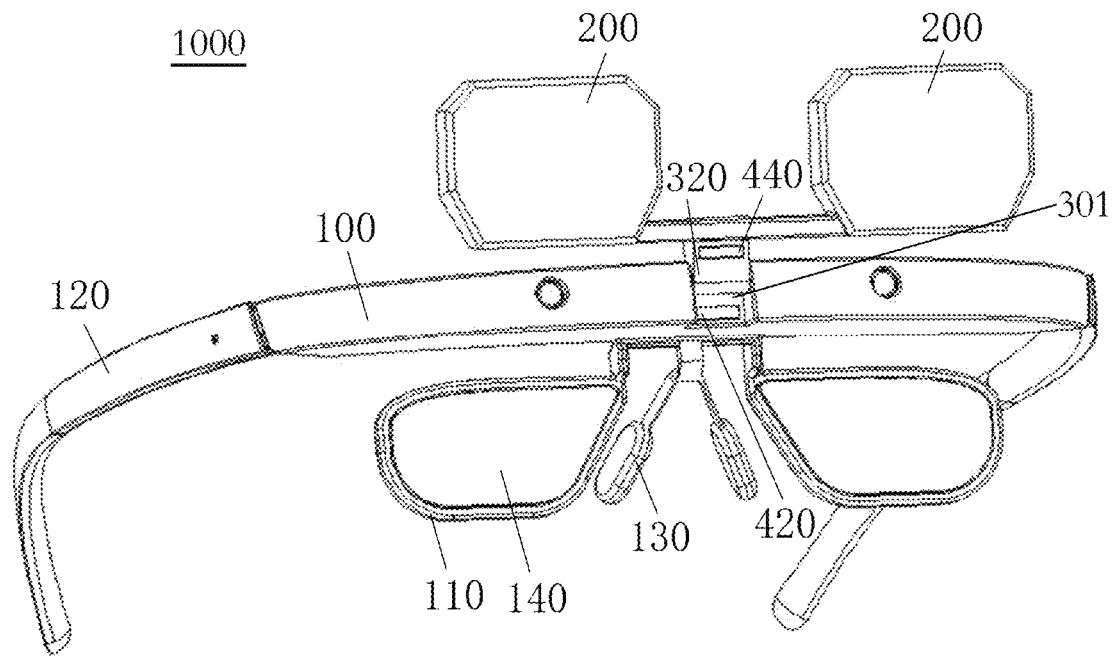
FIG. 3 is a perspective view schematically illustrating the AR eyeglasses according to the first embodiment of the present application, in which the optical module of the AR eyeglasses is in a second position.
Figure 4:
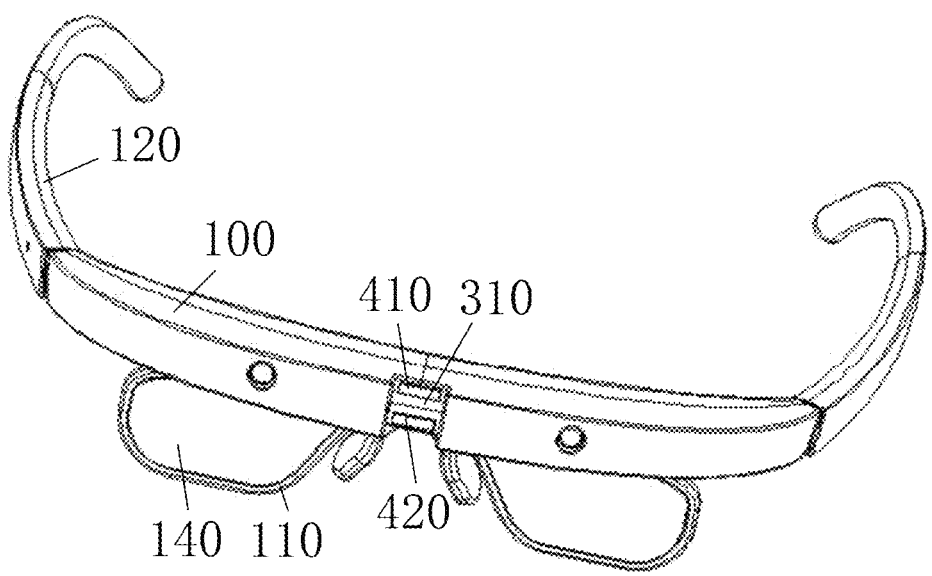
FIG. 4 is a perspective view schematically illustrating the AR eyeglasses according to the first embodiment of the present application, in which the optical module of the AR eyeglasses has been removed.

In order that the optical module 200 can be stopped in the first position and the second position respectively, the AR eyeglasses 1000 can also include a limit mechanism. The limit mechanism works between the frame 100 and the optical module 200. In the embodiment illustrated by FIGS. 1 to 4, the limit mechanism includes a first magnet 410, a second magnet 420, a third magnet 430 and a fourth magnet 440. In the embodiments of the present application, each magnet can be a magnetic sheet or a soft magnetic strip and is elongated, such that it can be attached and secured on the frame 100 or the base 320. For instance, securing the magnets can be accomplished by an adhesive. For instance, the first magnet 410 and the second magnet 420 can be secured in the middle groove 301 of the frame 100 at two lateral sides of the shaft 310 respectively, and the third magnet 430 and the fourth magnet 440 are secured on opposite sides of the base 320 and do not coincide with each other. After the magnets are secured in place, the first magnet 410 has an exposing side and the third magnet 430 has an exposing side such that the two exposing sides have different magnetic performances; further, the second magnet 420 has an exposing side and the fourth magnet 440 has an exposing side such that the two exposing sides have different magnetic performances. In this way, the magnets are arranged on the frame 100 and the base 320 respectively in such a manner that when the optical module 200 is in the first position as illustrated by FIG. 1, the second magnet 420 and fourth magnet 440 become close to each other or contact with each other and the first magnet 410 and the third magnet 430 are spaced from each other by a body of the base 320 such that the optical module 200 can be held in the first position under the action of a magnetic attractive force between the second magnet 420 and the fourth magnet 440; and when the optical module 200 is in the second position as illustrated by FIG. 3, the first magnet 410 and the third magnet 430 become close to each other or contact with each other and the second magnet 420 and fourth magnet 440 become far away from each other or spaced from each other by the body of the base 320 such that the optical module 200 can be held in the second position under the action of a magnetic attractive force between the first magnet 410 and the third magnet 430.

In an alternative embodiment (not shown), the first magnet 410 and the second magnet 420 are secured in two opposite sidewalls of the middle groove 301 respectively; the third magnet 430 is arranged in an end face of the base 320 opposing the sidewall in which the first magnet 410 is secured; the fourth magnet 440 is arranged in an end face of the base 320 opposing the sidewall in which the second magnet 420 is secured. When the optical module 200 is in the first position, the second magnet 420 and the fourth magnet 440 attract each other so as to prevent the optical module 200 from unexpectedly moving. When the optical module 200 is in the second position, the first magnet 410 and the third magnet 430 attract each other so as to prevent the optical module 200 from falling.

According to the present application, besides the magnets, the limit mechanism can be realized by means of a spring-loaded ball, snap-fit, interference-fit, or even jaw-ratchet.

Figure 5:
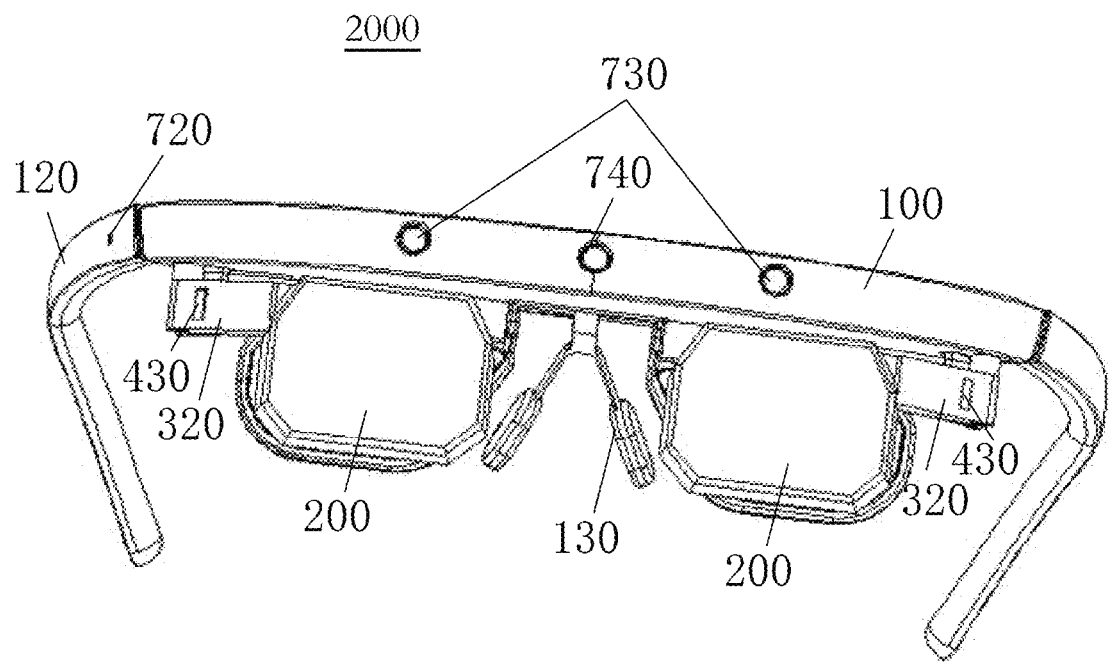
FIG. 5 is a perspective view schematically illustrating a pair of AR eyeglasses according to a second embodiment of the present application, in which an optical module of the AR eyeglasses is in a first position.
Figure 6:
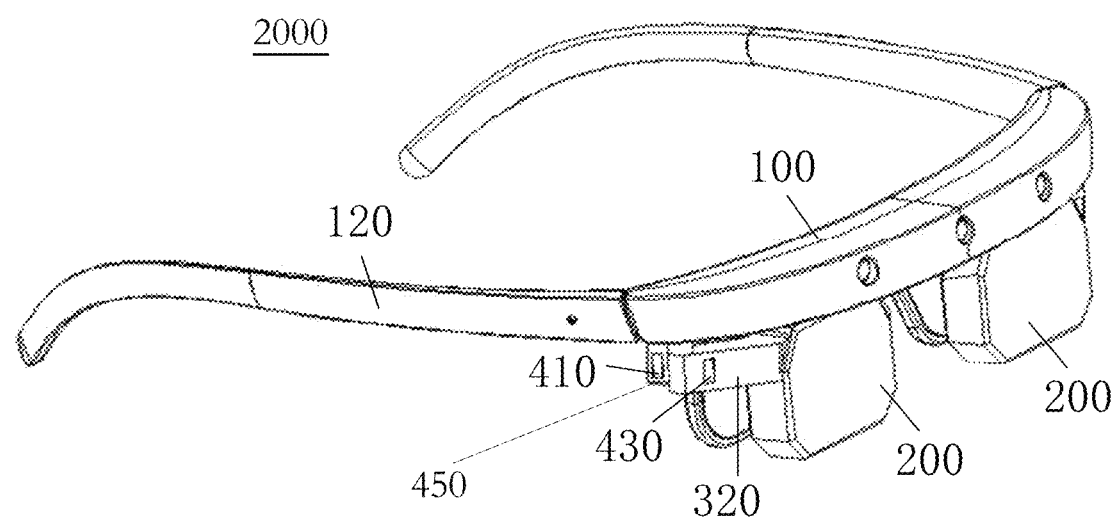
FIG. 6 is a perspective view schematically illustrating the AR eyeglasses according to the second embodiment of the present application viewed along another direction, in which the optical module of the AR eyeglasses is in the first position.
Figure 7:
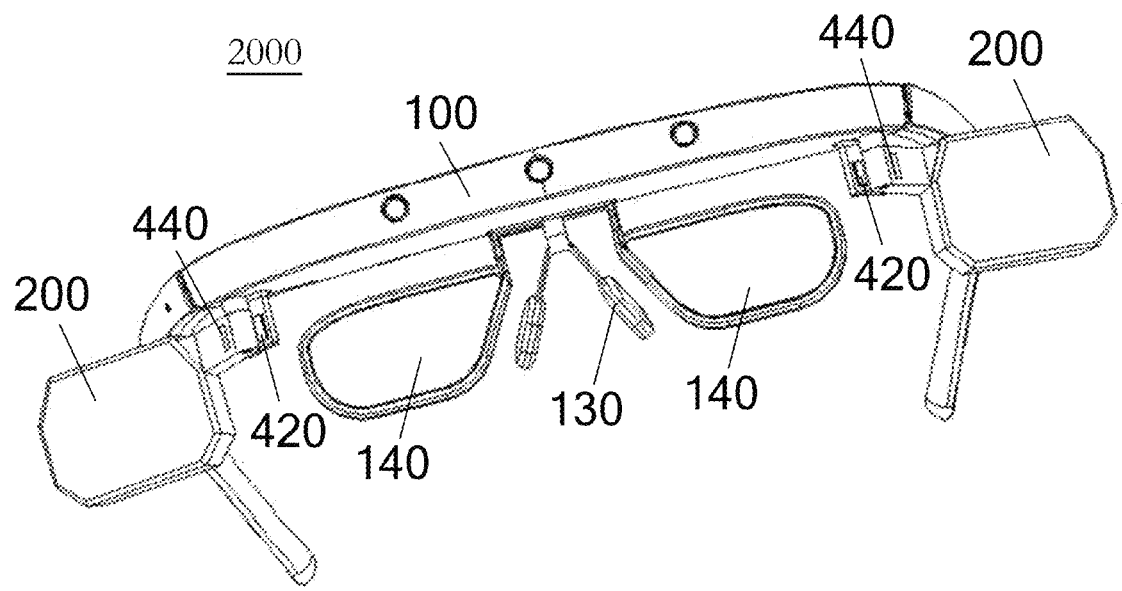
FIG. 7 is a perspective view schematically illustrating the AR eyeglasses according to the second embodiment of the present application, in which the optical module of the AR eyeglasses is in a second position.

FIGS. 5 to 7 schematically show a pair of AR eyeglasses 2000 according to a second embodiment of the present application. The AR eyeglasses 2000 include a frame 100 and an optical module 200 connected to the frame 100. For instance, according to the second embodiment, the optical module 200 includes two optical modules. Contrary to the first embodiment, in the AR eyeglasses 2000, the optical module 200 is pivotable/rotatable leftwards or rightwards relative to the frame 100. Particularly, a shaft 310 is arranged on each of left and right sides of the frame 100. Each shaft 310 is substantially perpendicular to the length direction of the frame 100. Furthermore, each optical module 200 is provided with a base 320. The respective base 320 is substantially located at a side of the respective optical module 200. Each base 320 is connected to the frame 100 in such a way that it is pivotable around the respective shaft 310. For instance, each base 320 is formed with a through hole through which the respective shaft 310 can extend. In this way, by rotating the optical module 200 leftwards or rightwards respectively, the optical module 200 can be moved into a first position (as shown in FIGS. 5 and 6) or a second position (as shown in FIG. 7). In the first position, the user, when wearing the AR eyeglasses 2000, can observe the outside scenery only through the optical module 200. In the second position, the user, when wearing the AR eyeglasses 2000, can observe the outside scenery, completely not through the optical module 200. That is to say, an augmented reality result can be provided for the user only when the optical module 200 is in the first position.

In the illustrated embodiment, the two shafts 310 are located at left and right sides of the frame 100 respectively such that the two shafts are far away from each other. However, in an alternative embodiment, the two shafts 310 can be arranged on the frame 100 such that they are close to each other and adjacent to a nose pad 130.

Similar to the first embodiment, the AR eyeglasses 2000 can include a range sensor 710, an ambient light sensor 720, a binocular camera 730 and a camera unit 740. However, contrary to the first embodiment, both the binocular camera 730 and the camera unit 740 can be arranged on a front side of the frame 100.

Furthermore, in the AR eyeglasses 2000, each shaft 310 is equipped with a mounting plate 450. For instance, the mounting plate 450 is secured on the frame 100 in such a way that it is slightly spaced from the respective shaft 310 (to the extent that the base 320 is not prevented from pivoting around the respective shaft 310). Therefore, a limit mechanism of the AR eyeglasses 2000 includes a first magnet 410, a second magnet 420, a third magnet 430 and a fourth magnet 440. The first magnet 410 and the second magnet 420 are secured on the mounting plate 450 substantially at both lateral sides of the shaft 301. The third magnet 430 and the fourth magnet 440 are secured on two opposite sides of the base 320 respectively. After the magnets are secured in place, the first magnet 410 has an exposing side and the third magnet 430 has an exposing side such that the two exposing sides have different magnetic performances; further, the second magnet 420 has an exposing side and the fourth magnet 440 has an exposing side such that the two exposing sides have different magnetic performances. The magnets are arranged on the frame 100 and the base 320 in such a way that when the optical module 200 is in the first position as illustrated by FIGS. 5 and 6, the second magnet 420 and the fourth magnet 440 become close to each other or contact each other and the first magnet 410 and the third magnet 430 are spaced from each other by a body of the base 320 such that the optical module 200 can be held in the first position under the action of a magnetic attractive force between the second magnet 420 and the fourth magnet 440; and when the optical module 200 is in the second position as illustrated by FIG. 7, the first magnet 410 and the third magnet 430 become close to each other or contact each other and the second magnet 420 and the fourth magnet 440 become far away from each other or spaced from each other by the body of the base 320 such that the optical module 200 can be held in the second position under the action of a magnetic attractive force between the first magnet 410 and the third magnet 430.

Figure 8:
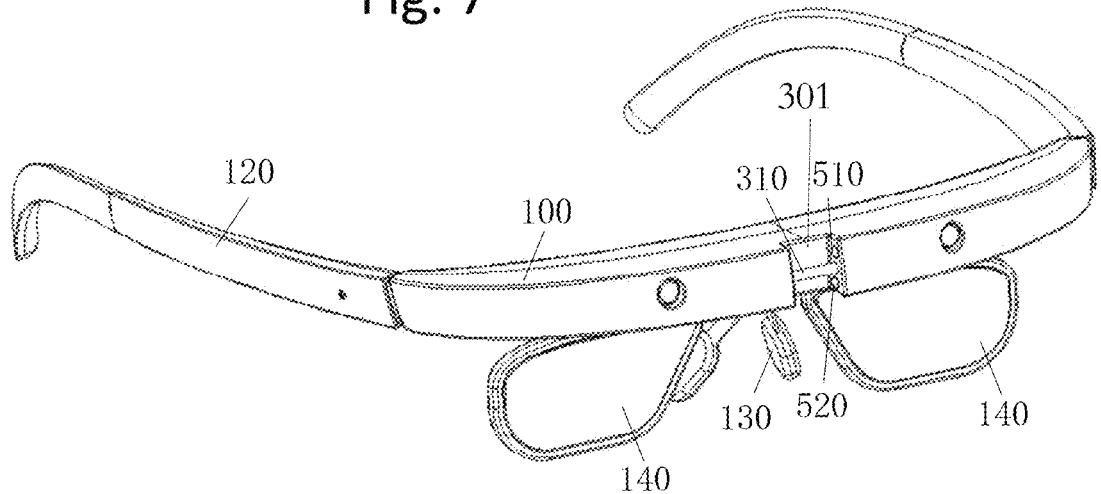
FIG. 8 is a perspective view schematically illustrating a pair of AR eyeglasses according to a third embodiment of the present application, in which an optical module of the AR eyeglasses is removed.
Figure 9:
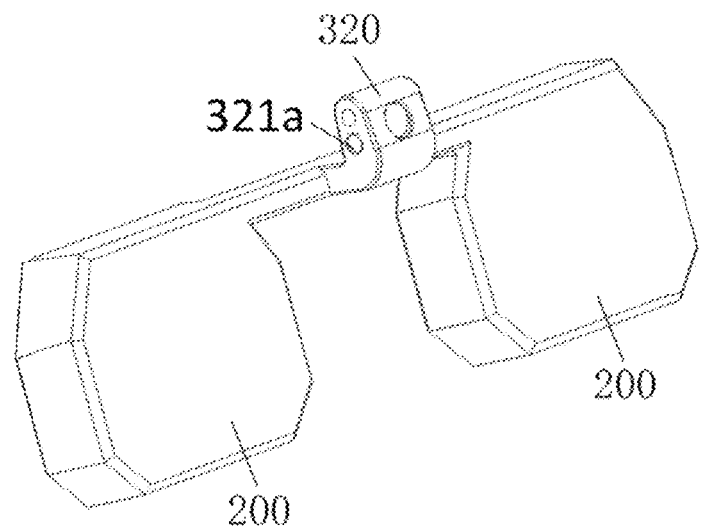
FIG. 9 is a perspective view schematically illustrating the AR eyeglasses according to the third embodiment of the present application.

FIGS. 8 and 9 schematically show a pair of AR eyeglasses according to a third embodiment of the present application. As the AR eyeglasses is constituted substantially in a manner similar to the first embodiment, those features in FIGS. 8 and 9 having the same reference numerals as the first embodiment can refer to the explanation of the first embodiment. Further as shown in FIG. 8, the middle groove 301 of the frame 100 is installed with a shaft 310. However, contrary to the first embodiment, a limit mechanism of the AR eyeglasses according to the third embodiment includes a first spring-loaded ball 510 and a second spring-loaded ball 520. The first spring-loaded ball 510 and the second spring-loaded ball 520 are arranged in a sidewall of the middle groove 301 and located at two lateral sides of the shaft 310 respectively. In the present application, the term "spring-loaded ball" refers to a ball which is loaded with a spring and inbuilt in a structure such that the ball can partially protrude from the structure, and retract into the structure under an external force, but automatically protrude from the structure without the external force. Further, as shown in FIG. 9, a groove 321a is formed in a sidewall of the base 320 and a through hole is formed in the base 320, through which hole the shaft 310 can pass. The groove 321a is spaced from the through hole. Furthermore, the distance between the groove 321a and the through hole is equal to the distance between the spring-loaded ball 510 or 520 and the shaft 310. In the embodiment as illustrated by FIG. 8, the second spring-loaded ball 520 is located below the first spring-loaded ball 510. When the base 320 is installed, the sidewall of the base 320 formed with the groove 321a opposes the sidewall of the middle groove 301 formed with the spring-loaded balls. After the base 320 is installed relative to the frame 100 in place, the groove 321a of the base 320 can receive the second spring-loaded ball 520, if the base 320 is rotated into the first position, such that the optical module 200 cannot be unexpectedly moved relative to the frame 100. When it is desired to turn from the first position to the second position, the user can rotate the optical module 200 upwards. The base 320 is pivoted around the shaft 310 such that the second spring-loaded ball 520 is pressed to retract into the sidewall of the middle groove 301. Then, when the optical module 200 is moved into the second position, the groove 321a of the base 320 can receive the first spring-loaded ball 510 so as to prevent the optical module 200 from unexpectedly falling.

In the illustrated embodiment, the first spring-loaded ball 510 and the second spring-loaded ball 520 are arranged in the same sidewall of the middle groove 301. However, in an alternative embodiment, the first spring-loaded ball 510 and the second spring-loaded ball 520 can be arranged in two opposing sidewalls of the middle groove 301 respectively. In this way, two corresponding grooves 321a can be provided in the respective opposing sidewalls of the base 320 so as to realize the limit mechanism.

Furthermore, it should be understood by the ordinary person in the art that the spring-loaded balls and the recesses can be swapped with each other. For instance, the spring-loaded balls can be provided in the base 320 and the recesses are provided in the sidewall of the middle groove 301. It can be conceived by the ordinary person in the art that in an alternative embodiment the spring-loaded balls and the recesses can be replaced by clamping protrusions and clamping grooves respectively such that the optical module 200 can be locked in the first or second position by means of interference-fit between the clamping protrusions and the clamping grooves.

In the embodiment of the present application in which the base 320 is pivoted around the shaft 310, the limit mechanism can be realized by jaw-ratchet. For instance, a ratchet can be secured on the shaft 310, and a jaw configured to cooperate with the ratchet can be provided in the base 320. In this way, by the cooperation of the jaw with the ratchet, the base 320 can be locked relative to the shaft 310 in place once being pivoted.

Figure 10:
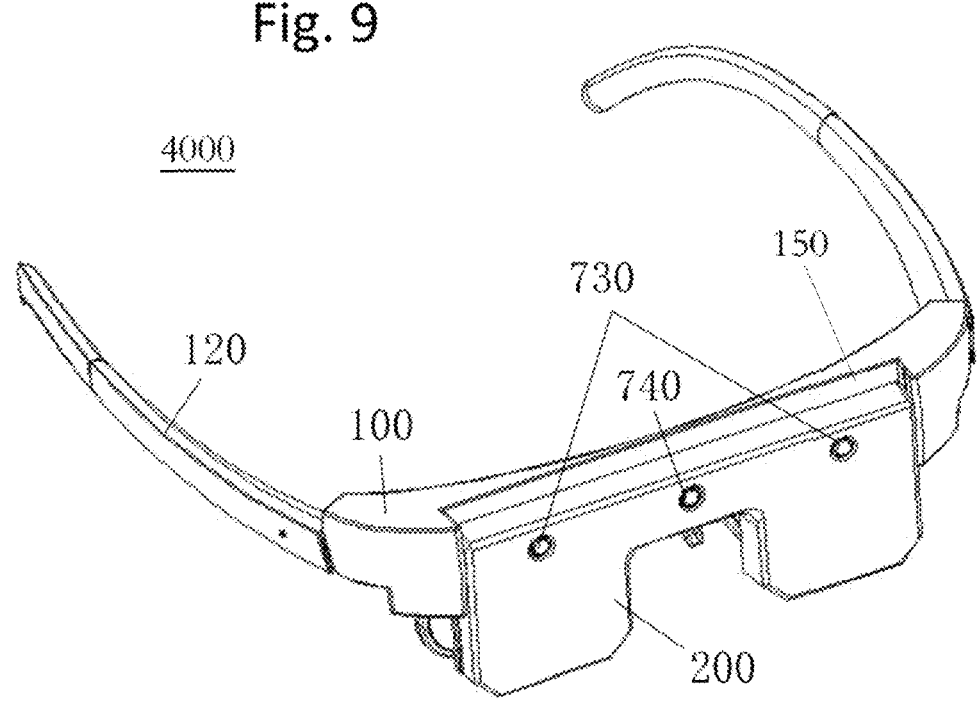
FIG. 10 is a perspective view schematically illustrating a pair of AR eyeglasses according to a fourth embodiment of the present application, in which an optical module of the AR eyeglasses is in a first position.
Figure 11:
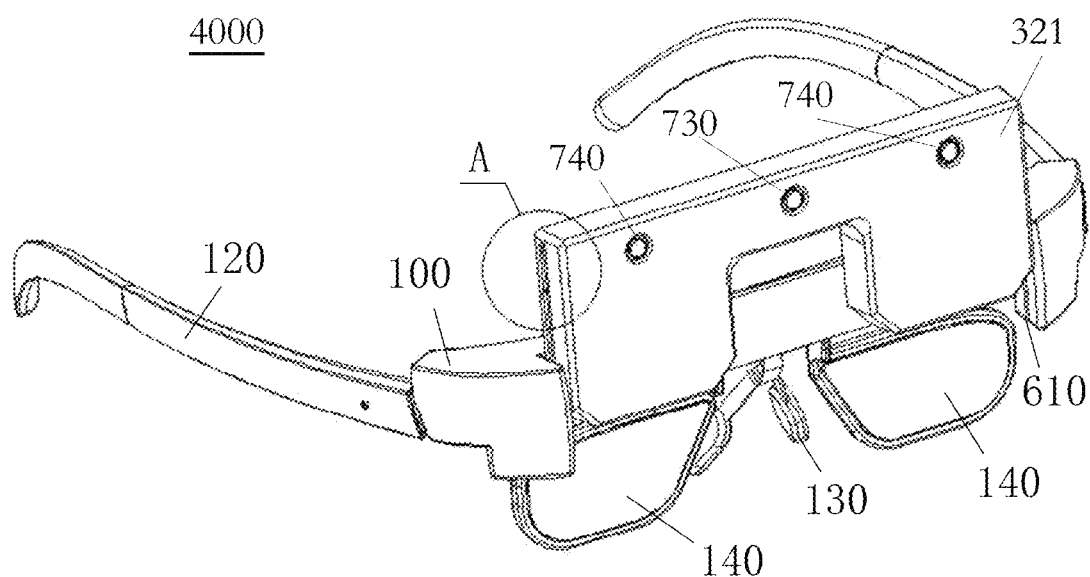
FIG. 11 is a perspective view schematically illustrating the AR eyeglasses according to the fourth embodiment of the present application, in which the optical module of the AR eyeglasses is in a second position.
Figure 12:
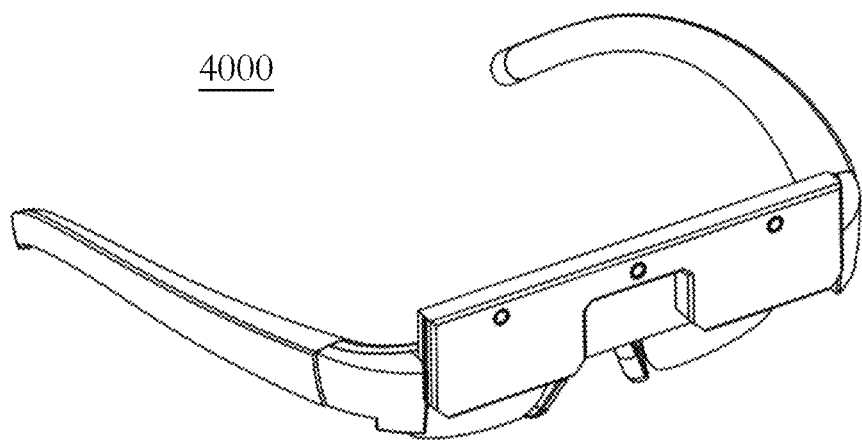
FIG. 12 is a perspective view schematically illustrating the AR eyeglasses according to the fourth embodiment of the present application, in which the optical module of the AR eyeglasses is in a position between the first position and the second position.

FIGS. 10 to 12 schematically show a pair of AR eyeglasses 4000 according to a fourth embodiment of the present application. The AR eyeglasses 4000 includes a frame 100 and an optical module 200 connected to the frame 100. In the fourth embodiment as illustrated by FIGS. 10 to 12, those features having the same reference numerals as FIGS. 1 to 9 can refer to the explanation of the embodiments described according to those figures.

In the fourth embodiment, the optical module 200 is linearly movable relative to the frame 100. Specifically, the optical module 200 includes a base 321. An optics system, a main circuit board, a camera and so on are installed in the base 321. In the illustrated embodiment, the base 321 is generally Π-shaped. The base 321 is connected to the frame 100 via a sliding fit structure such that they are slidable relative to each other. For instance, a sliding rail 620 is provided on each of laterally opposing sides of the base 321. The sliding rail 620 can be integrally formed in the base 321. A fit groove 150 is formed in the frame 100. The fit groove 150 is formed substantially along the length of the frame 100. A sliding slot 610 (only one being illustrated by FIG. 11) is formed in each of laterally opposing sidewalls of the fit groove 150. The two sliding rails 620 of the base 321 can be cooperatively inserted into the two sliding slots 610 respectively, such that the optical module 200 is slidable relative to the frame 100 to a first position (FIG. 10) or a second position (FIG. 11). In the first position, the user when wearing the AR eyeglasses 4000 can observe the outside scenery only through the optical module 200. In the second position, the user when wearing the AR eyeglasses 4000 can observe the outside scenery, completely not through the optical module 200. That is to say, an augmented reality result can be provided for the user only when the optical module 200 is in the first position. In the embodiment, a binocular camera 730 and a camera unit 740 of the AR eyeglasses 4000 can be provided in the base 321, as shown in FIG. 11.

Figure 13:
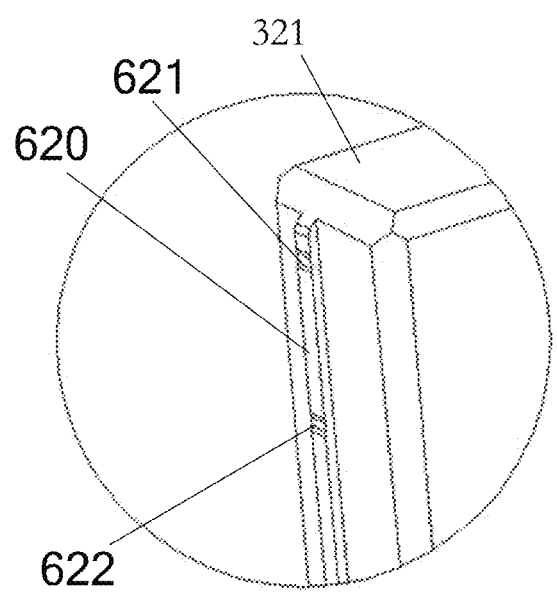
FIG. 13 is an enlarged view schematically illustrating a circular portion of FIG. 11.

As shown in FIG. 13, at least one sliding rail 620 of the base 321 is provided with two recesses 621 and 622. Furthermore, the sliding slot 610 cooperating with that sliding rail 620 provided with the recesses can be provided with a spring-loaded ball. In this way, during the process that the base 321 is slid, the spring-loaded ball can be received into the respective recess so as to lock the base 321 relative to the frame 100. The two recesses 621 and 622 are located corresponding to the first position and the second position of the optical module 200 respectively. For instance, when the spring-loaded ball is received by the recess 621, the optical module 200 is locked in the first position, and when the spring-loaded ball is received by the recess 622, the optical module 200 is locked in the second position.

In the fourth embodiment of the present application, when the optical module 200 is slid, no angular variation between it and the frame 100 occurs. Therefore, with respect to the person's eyes, when the optical module 200 is slid such that it partially blocks the person's sight, especially horizontal sight, an augmented reality result of the optical module 200 can be provided for the user. In this case, although the person's eyes are partially blocked by the optical module 200, the real-world scene can be directly watched such that the problems relating to color aberrations or distortions of the real-world scene's image caused by the optical module can be solved or even eliminated. Therefore, it will facilitate the user to carry out operations.

For instance, at a middle location or any other suitable location between the recesses 621 and 622, an additional recess is provided in the sliding rail 620. Further, as shown in FIG. 12, when the spring-loaded ball of the sliding slot 610 is received by the additional recess, the optical module 200 can be locked relative to the frame 100 in a position between the first position and the second position, in which position the user, when wearing the frame 100 of the AR eyeglasses, is able to observe the outside scenery both directly and through the optical module 200. For instance, the optical module 200 can be locked in an intermediate position between the first position and the second position, in which intermediate position about one half of the horizontal sight of the user who wears the frame 100 is able to pass through the optical module 200 to observe the outside scenery and the other half is used to directly observe the outside scenery. In the context of the present application, the horizontal sight refers to the sight of eyes of a person, who is normally standing or sitting and looking ahead substantially horizontally. Furthermore, in the context of the present application, the user who wears the frame of the eyeglasses or an equivalent feature or a similar feature directly observing the outside scenery means not only that he/she could observe the outside scenery with his/her naked eyes but also that he/she is able to observe the outside scenery through the lens 140 or a feature other than the optical module 200. Therefore, in the position or intermediate position between the first position and the second position, the optical module, especially its optical lens partially enters the static vision field of the user.

It should be understood by the ordinary person in the art that the sliding rail and the sliding slot can be swapped with each other between the base and the frame. Furthermore, although in the fourth embodiment the optical module 200 is designed to be slidable upwards or downwards relative to the frame 100, they can be designed to be slidable leftwards or rightwards relative to each other in other alternative embodiments.

Although the AR eyeglasses is taken as examples to give the above explanation, it should be understood by the ordinary person in the art that all embodiments described here can be applied to a head-mounted AR apparatus. For instance, the head-mounted AR apparatus can include a head gear and an optical module movably installed on the head gear, wherein the head gear like a helmet can be worn on the user's head. In particular, in case that the head-mounted AR apparatus is the AR eyeglasses, the head gear can be configured to include the frame 100 already mentioned above.

Furthermore, the embodiments described in the present application can be applied to an AR device installed on a pair of eyeglasses. For instance, such an AR device includes a fit bracket removably installed on a frame of the eyeglasses; an optical module configured to provide augmented reality display, wherein the optical module is connected to the fit bracket and movable relative to the fit bracket; and a limit mechanism arranged between the fit bracket and the optical module to enable the optical module to be selectively lockable in a first position or a second position relative to the fit bracket, wherein in the first position, a user when wearing the frame is able to observe the outside scenery only through the optical module, and in the second position, the user when wearing the frame is able to observe the outside scenery completely not through the optical module. The fit bracket of the AR apparatus can be configured in a manner similar to the frame 100 already mentioned above. For instance, the fit bracket can be installed on the frame of the eyeglasses by any suitable manners such as clamping, magnetizing, screwing or the like.

It should be noted that in the specification the terms "center or middle", "up", "down", "left", "right", "perpendicular", "horizontal", "in", "out" or the like cannot be understood to limit the present application because they are used to indicate orientation or position relationships which are only based on the attached drawings, for easy and brief explanation to the present application, and are not used to indicate or imply that the mentioned device or element have to be oriented particularly, configured at the particular position and operate. Furthermore, the terms "first", "second", "third" and so on are used herein for the purpose of explanation only and cannot be understood to indicate or imply the relative importance of them.

It is noticed that in the description of the present application the terms "install", "connect", and "connected" shall be understood in a broad sense, unless other specified or defined. For instance, the connection can refer to secured connection, or removable connection, or integral connection; or mechanical connection; or electrical connection; or direct connection, or indirect connection via a median media, or internal communication between two elements. It is understood by the ordinary person in the art that the meanings of those terms can be understood in the present application on a case-by-case basis.

Although specific embodiments of the present application have been described here in detail, they are given for the purpose of explanation only, and shall not be deemed as restraining the scope of the present application. Without departing from the spirit and scope of the present application, various alternations, replacements and modifications can be thought out.

The invention claimed is:

1. A head-mounted augmented reality (AR) apparatus comprising:
    a head gear configured to be worn on a user's head;
    an optical module configured to provide AR display, connected to the head gear, and movable relative to the head gear; and
    a limit mechanism acting between the head gear and the optical module to enable the optical module to be selectively lockable in a first position or a second position relative to the head gear, wherein in the first position the user, when wearing the head gear, is able to observe outside scenery only through the optical module, and in the second position the user, when wearing the head gear, is able to observe the outside scenery completely not through the optical module,
    wherein a sliding rail is arranged on one of the head gear and the optical module, and a sliding slot configured to cooperate with the sliding rail is arranged on the other of the head gear and the optical module,
    wherein the limit mechanism comprises a first feature provided in one of the sliding rail and the sliding slot and a second feature provided in the other of the sliding rail and the sliding slot, the number of the second feature is equal to the number of locked locations of the optical module relative to the head gear, and the second feature is able to cooperate with and be locked to the first feature.

2. The head-mounted AR apparatus in accordance with claim 1, wherein the optical module is lockable by the limit mechanism in a position between the first position and the second position, in which position the user, when wearing the head gear, is able to observe the outside scenery both through the optical module and directly.

3. The head-mounted AR apparatus in accordance with claim 1, wherein the first feature is configured as a spring-loaded ball, and the second feature is configured as a recess; or the first feature and the second feature are configured as magnets which are attractive to each other; or the first feature and the second feature are locked to each other via interference-fit.

4. A pair of AR eyeglasses, comprising:
    a frame of the eyeglasses;
    a pair of legs hinged with the frame;
    an optical module configured to provide AR display, connected to the frame, and movable relative to the frame; and
    a limit mechanism acting between the frame and the optical module to enable the optical module to be selectively lockable in a first position or a second position relative to the frame, wherein in the first position the user, when wearing the pair of AR eyeglasses, is able to observe outside scenery only through the optical module, and in the second position the user, when wearing the pair of AR eyeglasses, is able to observe the outside scenery completely not through the optical module,
    wherein a sliding rail is arranged on one of the frame and the optical module, and a sliding slot configured to cooperate with the sliding rail is arranged on the other of the frame and the optical module,
    wherein the limit mechanism comprises a first feature provided in one of the sliding rail and the sliding slot and a second feature provided in the other of the sliding rail and the sliding slot, the number of the second feature is equal to the number of locked locations of the optical module relative to the frame, and the second feature is able to cooperate with and be locked to the first feature.

5. The pair of AR eyeglasses in accordance with claim 4, wherein the first feature is configured as a spring-loaded ball, and the second feature is configured as a recess; or the first feature and the second feature are configured as magnets which are attractive to each other; or the first feature and the second feature are locked to each other via interference-fit.

6. The pair of AR eyeglasses in accordance with claim 4, wherein the optical module is lockable by the limit mechanism in a position between the first position and the second position, in which position the user, when wearing the pair of AR eyeglasses, is able to observe the outside scenery both through the optical module and directly.

7. A pair of AR eyeglasses, comprising:
    a frame of the eyeglasses;
    a pair of legs hinged with the frame;
    an optical module configured to provide AR display, connected to the frame, and movable relative to the frame; and
    a limit mechanism acting between the frame and the optical module to enable the optical module to be selectively lockable in a first position or a second position relative to the frame, wherein in the first position the user, when wearing the pair of AR eyeglasses, is able to observe outside scenery only through the optical module, and in the second position the user, when wearing the pair of AR eyeglasses, is able to observe the outside scenery completely not through the optical module,
    wherein the optical module is pivotable relative to the frame by a shaft, and the shaft is substantially parallel to or perpendicular to a length direction of the frame,
    wherein the limit mechanism comprises a first pair of fit features and a second pair of fit features arranged between the optical module and the frame, wherein the first pair of fit features are able to cooperate with each other in the first position to lock the optical module to the frame in place, and the second pair of fit features are able to cooperate with each other in the second position to lock the optical module to the frame in place.

8. The pair of AR eyeglasses in accordance with claim 7, wherein at least one of the first pair of fit features and the second pair of fit features cooperate with each other via magnetism, snap-fit or interference-fit.

9. The pair of AR eyeglasses in accordance with claim 7, wherein the first feature is configured as a spring-loaded ball, and the second feature is configured as a recess; or the first feature and the second feature are configured as magnets which are attractive to each other; or the first feature and the second feature are locked to each other via interference-fit.

* * * * *